(12) United States Patent
Shanthosh et al.

(10) Patent No.: US 12,143,021 B2
(45) Date of Patent: Nov. 12, 2024

(54) SYSTEM AND METHODS FOR SWITCHING AN ACTIVE CLAMP FLYBACK CONVERTER

(71) Applicant: SEMICONDUCTOR COMPONENTS INDUSTRIES, LLC, Phoenix, AZ (US)

(72) Inventors: Selvarajan Shanthosh, San Jose, CA (US); Bryan Wayne McCoy, Phoenix, AZ (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 166 days.

(21) Appl. No.: 17/804,404

(22) Filed: May 27, 2022

(65) Prior Publication Data

US 2022/0393597 A1    Dec. 8, 2022

Related U.S. Application Data

(60) Provisional application No. 63/202,304, filed on Jun. 4, 2021.

(51) Int. Cl.
*H02M 3/335* (2006.01)
*H02M 1/00* (2006.01)
*H02M 1/34* (2007.01)

(52) U.S. Cl.
CPC ..... *H02M 3/33507* (2013.01); *H02M 1/0058* (2021.05); *H02M 1/342* (2021.05)

(58) Field of Classification Search
CPC ............................................. H02M 3/335–42
See application file for complete search history.

(56) References Cited

U.S. PATENT DOCUMENTS

| | | | |
|---|---|---|---|
| 10,312,817 B2 | 6/2019 | Hari et al. | |
| 10,644,585 B1* | 5/2020 | Ye | H02M 1/4233 |
| 2012/0140531 A1* | 6/2012 | Lin | H02M 3/33507 |
| | | | 363/21.12 |
| 2019/0013739 A1* | 1/2019 | Hari | H02M 3/33569 |

* cited by examiner

*Primary Examiner* — Peter M Novak
(74) *Attorney, Agent, or Firm* — Brake Hughes Bellermann LLP

(57) ABSTRACT

An active clamp flyback (ACF) converter can be used to convert AC voltages to DC voltages and offers the ability to reuse leakage energy and a negative magnetizing current to achieve zero-volt-switching. The leakage energy can vary with system design and therefore may be difficult to control, but the negative magnetizing current can be controlled by adjusting a switching frequency of the ACF converter. The adjustment can be determined by comparing the negative magnetizing current to a threshold. Using a fixed threshold may not be optimal because variations in system operating conditions, such as load current, line voltage, and output voltage, can affect the amount of negative magnetizing current required for zero-volt-switching (i.e., can affect the threshold). Additionally, a range of possible switch technologies can affect the threshold. The present disclosure describes an adaptable threshold for a variable frequency ACF converter that allows for efficient switching.

19 Claims, 8 Drawing Sheets

SYSTEM AND METHODS FOR SWITCHING AN ACTIVE CLAMP FLYBACK CONVERTER

CROSS-REFERENCE TO RELATED APPLICATION

This application claims the benefit of U.S. Provisional Application No. 63/202,304, filed on Jun. 4, 2021, which is hereby incorporated by reference in its entirety.

FIELD OF THE DISCLOSURE

The present disclosure relates to switch-mode power supplies and more specifically to a system and method for controlling losses due to switching.

BACKGROUND

Efficiency may be highly desirable in a switch mode power supply (SMPS). For example, a highly efficient SMPS may utilize smaller components, which can help maintain reasonable sized devices for applications like battery charging, even as power requirements increase. One factor related to SMPS efficiency are the switching losses associated with the switching transistors of the SMPS. The efficiency of the switching transistors may be improved using a technique known as zero volt switching (ZVS).

SUMMARY

In some aspects, the techniques described herein relate to a power converter system including: an active clamp flyback (i.e., ACF) converter including: a primary winding of a transformer coupled between a positive input and a switch node; a main switch coupled between the switch node and a negative input of the ACF converter; and an active clamp coupled between a positive input and the switch node, the active clamp including a clamp capacitor coupled in series with a clamp switch; a pulse width modulation (PWM) controller configured to control ON/OFF states of the clamp switch and the main switch according to a PWM cycle operating at a PWM cycle frequency; and a frequency controller configured to: compare a fall period of a switch node voltage to a zero-volt-switching threshold to determine a negative current condition at the switch node; and adjust the zero-volt-switching threshold when the negative current condition for at least one PWM cycle in a sequence of PWM cycles is a hard-switch condition.

In some aspects, the techniques described herein relate to a power converter system, wherein the frequency controller is further configured to: adjust the PWM cycle frequency of the PWM controller based on the negative current condition.

In some aspects, the techniques described herein relate to a power converter system, wherein: the PWM cycle frequency is adjusted periodically at an inner loop frequency; and the zero-volt-switching threshold is adjusted periodically at an outer loop frequency, the inner loop frequency greater than the outer loop frequency.

In some aspects, the techniques described herein relate to a power converter system, wherein the ACF converter further includes: a secondary winding having a polarity opposite to the primary winding; a diode coupled between a first terminal of the secondary winding and a positive output of the ACF converter; and an output capacitor coupled between the positive output of the ACF converter and a negative output of the ACF converter.

In some aspects, the techniques described herein relate to a power converter system, wherein the frequency controller is further configured to: determine that the negative current condition is a high negative current condition when the fall period is less than the zero-volt-switching threshold; and determine that the negative current condition is a low negative current condition when the fall period is greater than the zero-volt-switching threshold.

In some aspects, the techniques described herein relate to a power converter system, wherein the frequency controller is further configured to: increase the PWM cycle frequency of the PWM controller when the negative current condition is the high negative current condition; and decreasing the PWM cycle frequency of the PWM controller when the negative current condition is the low negative current condition.

In some aspects, the techniques described herein relate to a power converter system, wherein the frequency controller is further configured to: detect that that a timeout period is reached before the fall period can be determined as the hard-switch condition.

In some aspects, the techniques described herein relate to a power converter system, wherein the frequency controller is further configured to: hard switch the main switch after the timeout period is reached, otherwise soft switch the main switch.

In some aspects, the techniques described herein relate to a method for switching a power converter including: sensing a switch-node voltage at a switch node of the power converter during a PWM cycle, the PWM cycle being one PWM cycle in a sequence of PWM cycles; measuring a fall period of the switch-node voltage during the PWM cycle; comparing the fall period to a zero-volt-switching threshold to determine a negative current condition of the PWM cycle; changing a PWM frequency for subsequent PWM cycles in the sequence of PWM cycles based on the negative current condition of the PWM cycle; and adjusting the zero-volt-switching threshold after a hard-switch condition has occurred.

In some aspects, the techniques described herein relate to a method, wherein comparing the fall period to the zero-volt-switching threshold to determine the negative current condition of the PWM cycle includes: determining the hard-switch condition when a timeout period occurs before the fall period can be measured.

In some aspects, the techniques described herein relate to a method, wherein adjusting the zero-volt-switching threshold after the hard-switch condition has occurred includes: counting a number of PWM cycles that have the hard-switch condition; and adjusting the zero-volt-switching threshold when the number of PWM cycles having the hard-switch condition exceeds an amount.

In some aspects, the techniques described herein relate to a method, wherein adjusting the zero-volt-switching threshold after the hard-switch condition has occurred further includes: decreasing the zero-volt-switching threshold when the number of PWM cycles having the hard-switch condition exceeds the amount.

In some aspects, the techniques described herein relate to a method, wherein comparing the fall period to the zero-volt-switching threshold to determine the negative current condition of the PWM cycle includes: determining a low negative current condition when the fall period is greater than the zero-volt-switching threshold.

In some aspects, the techniques described herein relate to a method, wherein changing the PWM frequency for subsequent PWM cycles in the sequence of PWM cycles based on the negative current condition of the PWM cycle includes: decreasing the PWM frequency when the low negative current condition has been determined.

In some aspects, the techniques described herein relate to a method, wherein comparing the fall period to the zero-volt-switching threshold to determine the negative current condition of the PWM cycle includes: determining a high negative current condition when the fall period is less than the zero-volt-switching threshold.

In some aspects, the techniques described herein relate to a method, wherein changing the PWM frequency for subsequent PWM cycles in the sequence of PWM cycles based on the negative current condition of the PWM cycle includes: increasing the PWM frequency when the high negative current condition has been determined.

In some aspects, the techniques described herein relate to a method for switching a power converter including: according to a frequency update rate: measuring a fall period for a switch node voltage of a PWM cycle in a sequence of PWM cycles; comparing the fall period to a zero-volt-switching threshold to determine a negative current condition by; and adjusting a PWM cycle frequency for subsequent PWM cycles in the sequence of PWM cycles based on the negative current condition; and according to a threshold update rate: detecting an occurrence of a PWM cycle having a hard-switch condition; and adjusting the zero-volt-switching threshold based on the occurrence.

In some aspects, the techniques described herein relate to a method for switching the power converter, wherein detecting the occurrence of the PWM cycle having the hard-switch condition includes: detecting that a timeout period is reached before the fall period can be determined as the hard-switch condition.

In some aspects, the techniques described herein relate to a method for switching the power converter, wherein: the frequency update rate is greater than the threshold update rate.

In some aspects, the techniques described herein relate to a method for switching a power converter, wherein: the negative current condition is a high negative current when the fall period is less than the zero-volt-switching threshold; and the negative current condition is a low negative current when the fall period is greater than the zero-volt-switching threshold.

In some aspects, the techniques described herein relate to a method for switching a power converter, wherein adjusting the PWM cycle frequency for subsequent PWM cycles based on the negative current condition includes: increasing the PWM cycle frequency when the negative current condition is the high negative current; and decreasing the PWM cycle frequency when the negative current condition is the low negative current.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
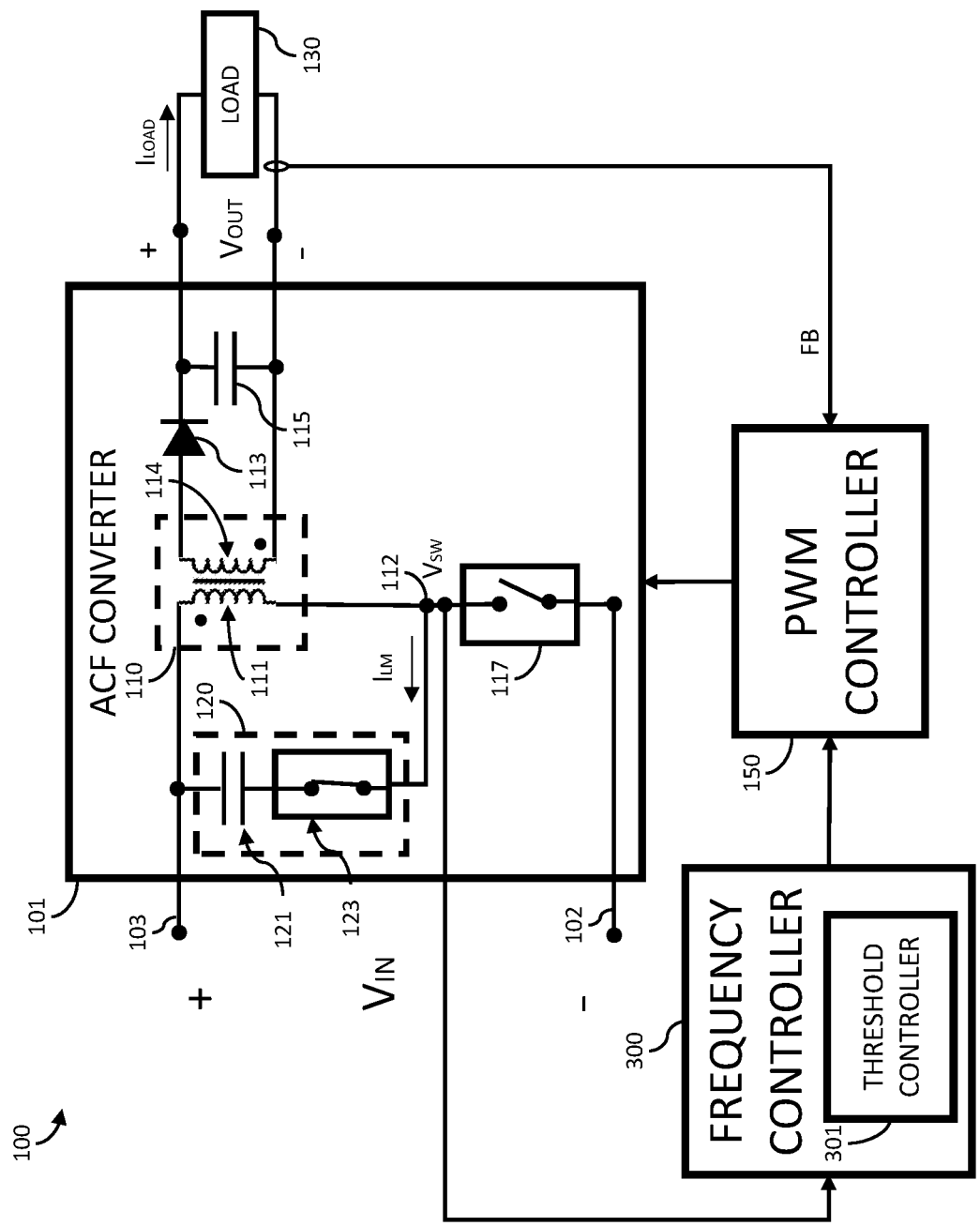
FIG. 1 is a schematic of power converter system including an active clamp flyback (ACF) converter according to an implementation of the present disclosure.

The present disclosure describes systems and methods to adjust the switching control of an active clamp flyback power converter (i.e., ACF converter) to effectuate zero volt switching (ZVS) to reduce losses (e.g., conduction losses and/or capacitive ($C_{OSS}$) losses). The control adjusts a switching frequency of the ACF converter based on a determination of a negative current condition. The determination can be made by measuring a fall period of a switch node voltage during a pulse width modulation (PWM) cycle and comparing the measured fall period to a threshold. In some situations, a timeout period expires before the fall period can be measured. In these situations, a hard-switch condition is detected and the ACF converter is hard switched. The disclosed control further includes adjusting the threshold after one or more of the hard switched PWM cycles occurs.

The disclosed systems and methods may be implemented to address a technical problem of having to select one threshold to determine a negative current condition for all possible applications. In this way, the disclosed systems and methods may be applied to a plurality of operating conditions (e.g., load conditions) and to a plurality of device technologies (e.g., Si, super-junction (SJ), GaN and SiC)) which may have different zero-current-switching requirements.

The disclosed systems and methods may provide the technical effect of reducing losses in an ACF converter by harvesting a negative current in a PWM cycle to help charge a switching capacitance of a transistor of the ACF converter so that it can be switched (e.g., turned ON) using less power. The disclosed techniques can help to prevent over-charging or under-charging the switching capacitance as load conditions change, which can lower efficiency.

Zero-volt-switching (ZVS) of an ACF converter can be achieved by making a voltage across a capacitance at a switch node of the SMPS close to zero (e.g., $-0.1V \leq V_{SW} \leq +0.1V$). This approach is called zero-volt-switching (ZVS). As used herein, ZVS may not mean using a voltage that is precisely zero. For example, small variations around zero may still allow for efficient switching. Accordingly, the terms "soft switching" and "zero-volt-switching" are used interchangeably. These terms include switching a transistor with an efficiency above a value (e.g., efficiency >50%). The term "hard switching" includes switching the transistor with an efficiency below a value (e.g., efficiency <50%). While soft switching each PWM cycle may provide a high efficiency (e.g., maximum efficiency, optimal efficiency), there may be situations in which a few PWM cycles in a sequence require hard switching. This hard switching may reduce the overall efficiency but may be unavoidable, and the system may still operate with a suitable efficiency on average. The present disclosure accounts for these hard switching events and can help to adapt the soft switching algorithm as each occurs or as they become prevalent.

FIG. 1 is a schematic of a power converter system 100 including an ACF converter 101 according to an implementation of the present disclosure. The ACF converter includes a flyback transformer (i.e., transformer 110) having a primary winding 111 and a secondary winding 114 that are opposite polarities, as indicated by the dots. The primary winding 111 of the transformer may serve as the energy storage inductor in a power converter (e.g., buck converter). The ACF includes a primary side switch (i.e., main switch 117) for voltage conversion.

When the main switch 117 is turned ON (i.e., shorted), the primary winding 111 can be charged by the input voltage ($V_{IN}$). The charging of the primary winding 111 reverse biases a diode 113 in the secondary-side circuit due to the polarity difference between the primary winding 111 and the secondary winding 114. The diode 113, which is reversed biased, decouples an output capacitor 115 from the transformer 110. Accordingly, when the main switch 117 is ON, output power is supplied to a load 130 by the output capacitor 115.

When the main switch 117 is turned OFF (i.e., opened) the primary winding changes polarity and begins to discharge. The change in the polarity forward biases the diode 113 which couples the output capacitor 115 to the transformer 110. Accordingly, when the main switch is OFF, the output capacitor 115 is recharged, and output power is supplied to the load 130 by the transformer 110.

The change in polarity when the main switch 117 is turned OFF can generate a large transient voltage, which can cause stress on the main switch 117 and the diode 113. The ACF converter includes an active clamp 120 configured to limit this transient voltage. By limiting the transient voltage, power ratings for the main switch 117 and the diode 113 can be reduced, which can help reduce a physical size of the ACF converter 101.

The operation of the active clamp 120 can be explained as follows. When the main switch 117 is ON, a voltage at a switch node 112 (i.e., switch node voltage ($V_{SW}$)) may be the voltage of a negative input 102 of the ACF converter 101 (e.g., zero volts, ground). When the main switch 117 is turned OFF, however, the switch node voltage ($V_{SW}$) at the switch node 112 may change to the input voltage ($V_{IN}$) plus a transient voltage ringing due to a resonance generated by an inductance (e.g., leakage inductance) and a capacitance (e.g., clamp capacitance) in the ACF converter 101. The active clamp 120 turns ON to clamp the transient by coupling the switch node 112 to a positive input 103 of the ACF converter 101. The active clamp 120 provides a current path for the discharging current of the primary winding 111 and can store this energy for future use, which can increase the efficiency of the ACF converter 101.

The active clamp 120 includes a clamp switch 123. When the main switch 117 is turned OFF, the clamp switch 123 can be turned ON (i.e., shorted) to provide a current path for the primary coil current (i.e., magnetizing current ($I_{LM}$)) to limit the voltage transient. Rather than dissipating this current, the active clamp 120 includes a clamp capacitor 121, which can store this energy. The stored energy can be delivered to the load in a subsequent pulse width modulation cycle (i.e., PWM cycle) and can be used to help switch the main switch 117. The clamp capacitor 121 may be coupled in series with the clamp switch 123.

The switching of the ACF converter 101 may be controlled by a pulse width modulation controller (i.e., PWM controller 150). The PWM controller is configured to receive a feedback signal (FB) corresponding to a sensed load condition (e.g., load current and/or load voltage) and to control the switching accordingly. For example, in a light-load condition the load 130 may draw less load current ($I_{LOAD}$) than in a heavy-load condition. Accordingly, an amount of current stored in the primary winding 111 in the light-load condition can be less than stored in a heavy-load condition.

When a light-load condition is detected, the PWM controller 150 may reduce a time that the main switch 117 is ON. This reduction in the amount of energy stored can prevent wasting energy and improve efficiency. The adjustment of the time that the main switch is ON may be carried out by an adjustment to a duty cycle (i.e., pulse width) of a switching signal. Accordingly, this control of the switching signal to address the load requirements (i.e., load condition) can be referred to as PWM control.

The active clamp 120 can drain the current (i.e., magnetizing current ($I_{LM}$)) from the primary winding, while it is ON. In fact, if the active clamp 120 remains ON for longer than a time necessary to drain the current from the primary winding, then the coil current will change directions. In other words, when the clamp switch 123 first turns ON, the current ($I_{LM}$) will flow away from the switch node 112 to the clamp capacitor 121 (i.e., positive current). After a period, the current will change directions and flow from the clamp capacitor 121 to the switch node 112 (i.e., negative current). This reversal of current can be used to help switch (e.g., turn ON) the main switch 117 when it is implemented as a transistor.

Figure 7:
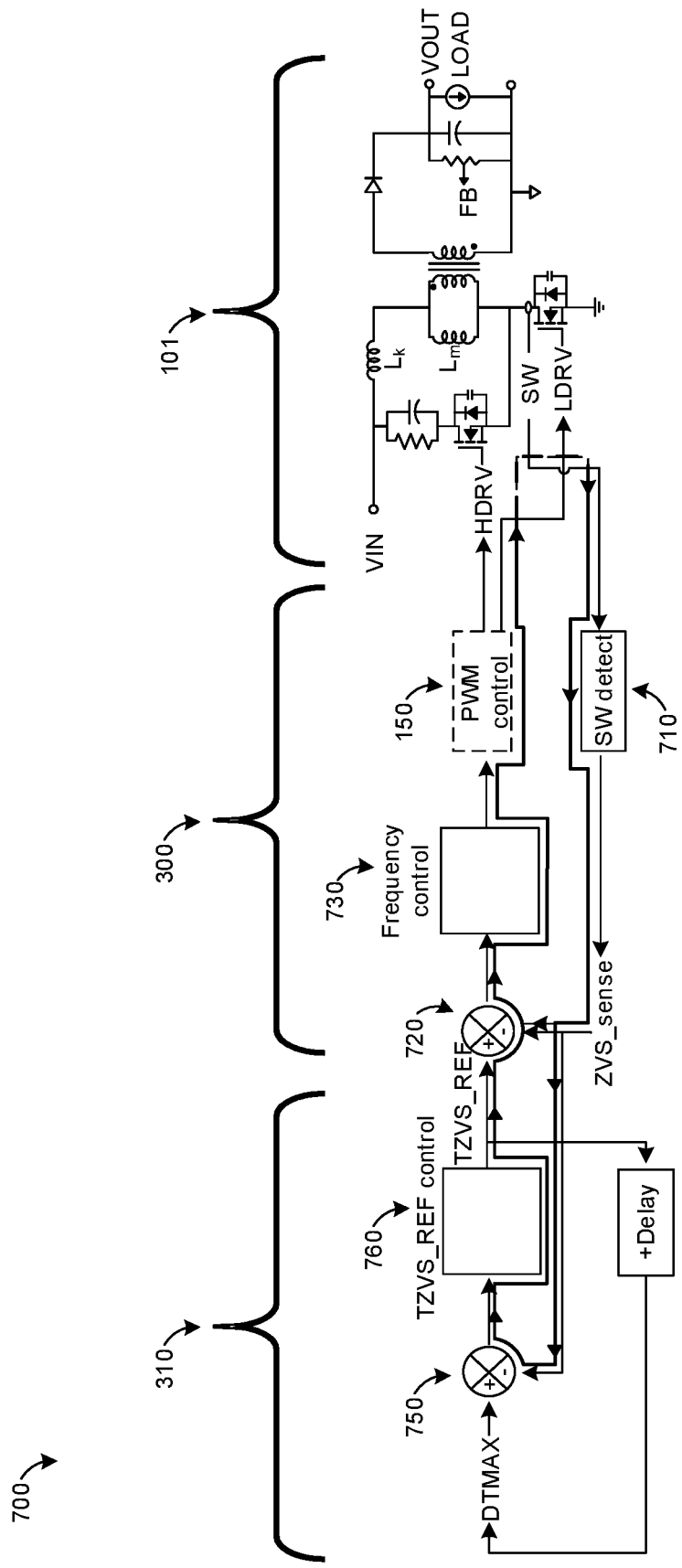
FIG. 7 is a schematic of power converter system including an active clamp flyback converter according to an implementation of the present disclosure.

The main switch 117 (and the clamp switch 123) can be implemented as an N-type or a P-Type transistor fabricated using a variety of technologies, such as silicon (Si) (e.g., super junction), gallium-nitride (GaN), or silicon carbide (SiC). For example, the main switch can be an Si field effect transistor (FET) or a GaN FET. The FET may be a metal oxide semiconductor FET (i.e., MOSFET). As shown in FIG. 7, the main switch 117 and the clamp switch 123 may be implemented as N-type MOSFETs.

Switching the main switch MOSFET may introduce losses, which can limit a maximum switching rate and/or a switching efficiency of the ACF converter 101. The switching losses can be related to an output capacitance ($C_{OSS}$) of the MOSFET, which is charged for the switch to change states (e.g., OFF to ON). The reversal of the magnetizing current ($I_{LM}$) at the end of a PWM cycle can help charge the output capacitance of the main switch 117, which can reduce losses, making the switching more efficient. This form of switching is known as zero volt switching (ZVS) or soft switching.

The disclosed ACF can generate a negative magnetizing current to achieve ZVS. ZVS requires an amount of negative magnetizing current (i.e., negative current ($I_{NEG}$)) corresponding to the output capacitance of the MOSFET. Generating more negative current than required for ZVS may not improve switching and can add to the losses in the system. Accordingly, it may be desirable to minimize, or eliminate, negative current other than required for ZVS. The amount of negative current generated can be configured by a time that the clamp switch 123 is held in the ON state.

Figure 2:
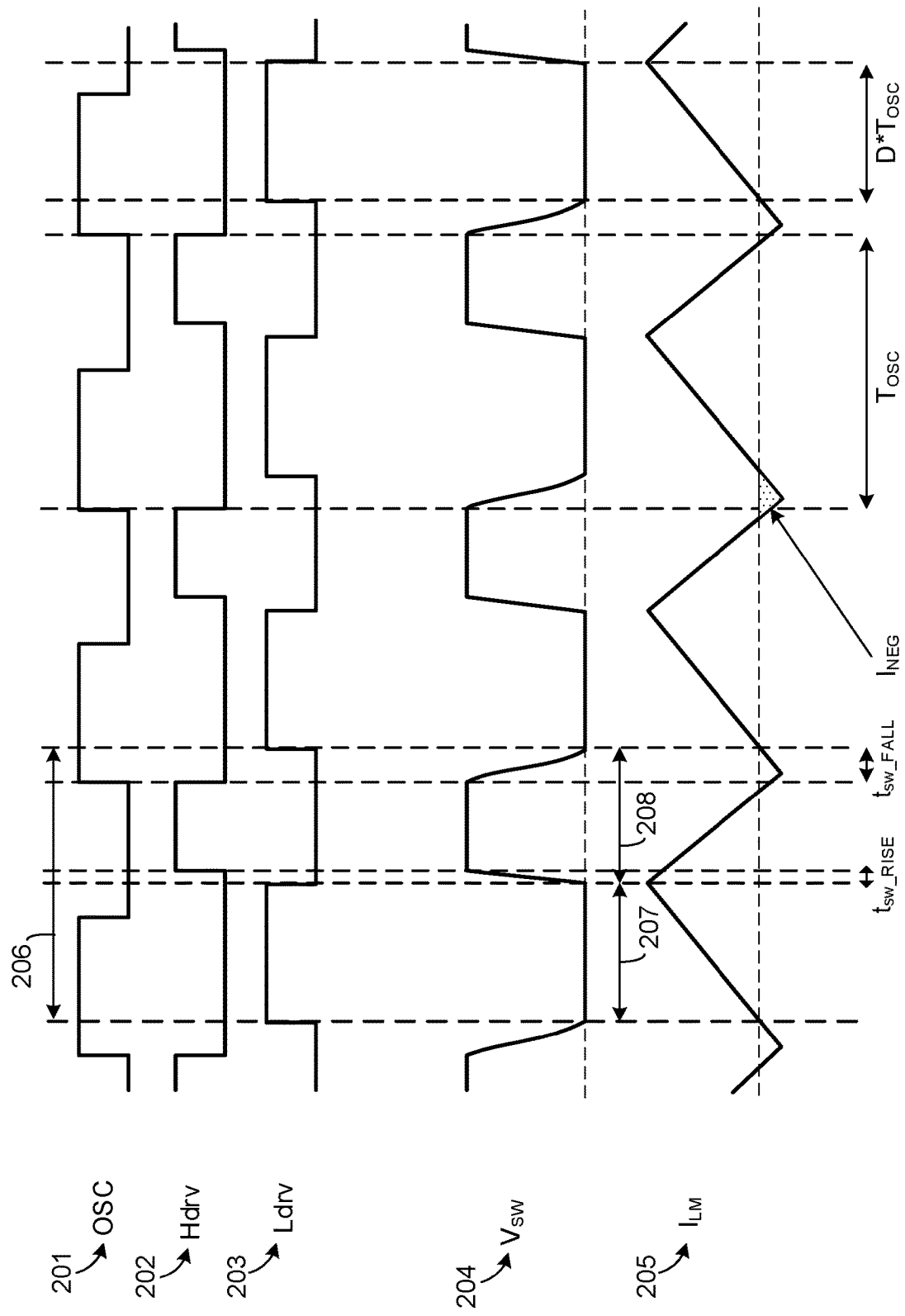
FIG. 2 are graphs illustrating possible signals associated with the ACF converter of FIG. 1.

FIG. 2 are graphs illustrating possible signals associated with the ACF converter 101 of FIG. 1. Relationships may be inferred between the signals because the signals are plotted on the same time scale for the same particular time duration (i.e., for the same window of time). Five signals are shown.

A first signal, shown in FIG. 2, is an oscillator signal (i.e., OSC signal 201) generated by the PWM controller. The OSC signal is the reference signal for the PWM switching and may be referred to as the PWM signal. The OSC signal 201 changes from HIGH to LOW (and LOW to HIGH) in a cycle of the OSC signal (i.e., PWM cycle). The rate of cycle is the frequency of the OSC signal (i.e., PWM frequency). A period of the OSC (i.e., $T_{OSC}$) is the time necessary for a PWM cycle of the OSC signal.

A second signal, shown in FIG. 2, is a high-drive signal (Hdrv signal 202). The Hdrv signal 202 may be generated by the PWM controller 150 and applied to a controlling terminal (e.g., gate terminal) of the clamp switch 123, when the clamp switch is implemented as an N-type MOSFET. In other words, when the Hdrv signal 202 is HIGH, the clamp switch 123 will be ON (i.e., conducting), and when the Hdrv signal 202 is LOW, the clamp switch 123 will be OFF (i.e., not conducting).

A third signal, shown in FIG. 2, is the low-drive signal (Ldrv signal 203). The Ldrv signal 203 may be generated by the PWM controller 150 and applied to a controlling terminal (e.g., gate terminal) of the main switch 117, when the main switch is implemented as an N-type MOSFET. In other words, when the Ldrv signal 203 is HIGH, the main switch 117 will be ON (i.e., conducting), and when the Ldrv signal 203 is LOW, the main switch 117 will be OFF (i.e., not conducting).

The Hdrv signal 202 and the Ldrv signal 203 are controlled so they are not HIGH simultaneously. The Hdrv signal 202 and the Ldrv signal 203 can be LOW simultaneously. As shown in FIG. 2, the Hdrv signal 202 transitions from HIGH to LOW whenever the OSC signal 201 transitions from LOW to HIGH.

As shown in FIG. 2, a fall period (i.e., $t_{SW\_FALL}$) after the Hdrv signal 202 transitions LOW, the Ldrv signal 203 transitions from LOW to HIGH. The Ldrv signal 203 is held HIGH for a period determined by a duty factor (i.e., D) and the period of the OSC signal 201 (i.e., $D \cdot T_{OSC}$). The duty factor (D) can be determined by the PWM controller 150 based on the power demands of the load 130 (i.e., load condition). The power demands of the load may be sensed as a feedback signal (FB). For example, the FB signal may be a voltage and/or current corresponding to a voltage at the load 130 and/or a current drawn by the load 130.

As shown in FIG. 2, a rise period (i.e., $t_{SW\_RISE}$) after the Ldrv signal transitions LOW, the Hdrv signal 202 transitions from LOW to HIGH. The Hdrv signal 202 is held HIGH until the OSC signal 201 transitions from LOW to HIGH, at which point the PWM cycle described above repeats. During the rise period ($t_{SW\_RISE}$) and the fall period ($t_{SW\_FALL}$), the main switch 117 and the clamp switch 123 may be OFF (i.e., not conducting).

A fourth signal, shown in FIG. 2, is a switch node signal (i.e., switch node voltage 204). The switch node voltage 204 ($V_{SW}$) may alternate according to the switch conditions. For example, while the main switch 117 is ON (i.e., Ldrv signal 203 is HIGH), the switch node 112 may be coupled to the negative input 102 of the primary side, making the switch node voltage 204 LOW. Additionally, while the clamp switch 123 is ON (i.e., Hdrv signal 202 is HIGH), the switch node 112 may be coupled to the positive input 103 of the primary side via the clamp capacitor 121, making the switch node voltage 204 HIGH. The rise period ($t_{SW\_RISE}$) is the time for the switch node voltage 204 to transition from LOW to HIGH and the fall period ($t_{SW\_FALL}$) is the period it the time for the switch node voltage 204 to transition from HIGH to LOW.

A fifth signal, shown in FIG. 2, is a magnetizing current signal (i.e., magnetizing current 205). The magnetizing current ($I_{LM}$) is the current at the switch node. A positive magnetizing current flows from the switch node 112 to the active clamp 120 (e.g., to charge the clamp capacitor 121). A negative magnetizing current flows into the switch node 112 (e.g., to charge the capacitance of the main switch 117 for ZVS). While the magnetizing current is increasing, the primary-side inductor of the transformer 110 is being charged and is decoupled from the load 130 by the diode 113, which is OFF. While the magnetizing current is decreasing, the primary-side inductor of the transformer 110 is being discharged and is coupled to the load 130 by the diode 113, which is ON. Accordingly, the magnetizing current may be referred to as in a charging phase when it is increasing and in a discharging phase when it is decreasing. In ACF converter operation, the magnetizing current cycles between the charging phase and the discharging phase according to the PWM signal and switching dynamics described above.

As shown in FIG. 2, each PWM cycle 206 includes a charging period 207 and a discharging period 208. For example, the charging period 207 may begin when the Ldrv signal 203 transitions from LOW to HIGH (i.e., the main switch is turned ON) at the start of a first PWM cycle. The discharging period 208 of the first PWM cycle may end when the Ldrv signal transitions from LOW to HIGH at the start of a second (subsequent) PWM cycle. The discharging period 208 can include a negative current portion that corresponds to the fall period ($t_{SW\_FALL}$) of the switch node voltage ($V_{SW}$).

Power requirements of the load 130 may be met by adjusting the charging time of the primary side inductor to match a load condition. A heavy-load condition may correspond to a load (e.g., a low resistance load) that requires a high current to maintain voltage at the output of the ACF converter. A light-load condition may correspond to a load (e.g., a high resistance load) that requires a low current to maintain voltage at the output of the ACF converter.

When the OSC signal frequency is fixed, a changing load condition can change the amount of negative current. The negative current may be calculated as a negative area under the $I_{LM}$ trace. The negative current may be referred to as negative km current or simply negative current (i.e., $I_{NEG}$). A heavy-load condition may have almost no negative current because the load may draw almost all of the stored energy from the primary winding 111. In a light-load condition, however, the amount of negative current may be larger and can be in excess of the negative current needed for ZVS. Increasing the OSC signal frequency in a light-load condition can reduce the amount of excess negative current without affecting the power delivered to the load 130.

Figure 3:
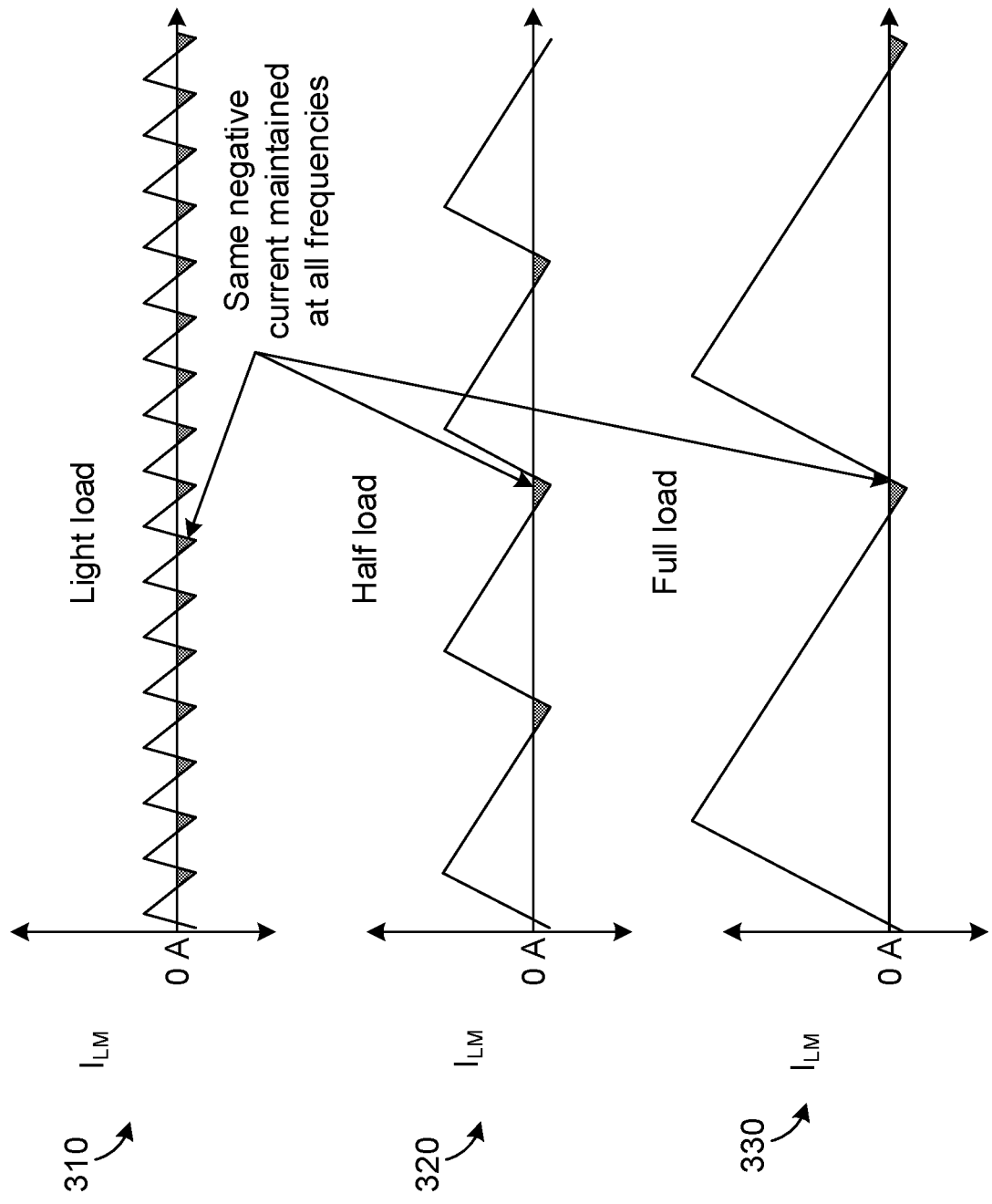
FIG. 3 are graphs illustrating magnetizing current of an ACF converter for different load conditions according to an implementation of the present disclosure.

FIG. 3 illustrates the magnetizing current ($I_{LM}$) for three load conditions: a light load condition 310, a half load condition 320, and a full load condition 330 (i.e., heavy-load condition). In the light load condition 310, the load draws less current than in the half load condition 320, and in the half load condition 320, the load draws less current than in the full load condition 330. A charge/discharge frequency of $I_{LM}$ is adjusted for each load condition in order to make the amount of negative current in each load condition approximately the same. For example, the light load condition 310 has a higher frequency than the half load condition 320 or the full load condition 330. Further, the half load condition 320 has a higher frequency than the full load condition 330 but a lower frequency than the light load condition 310. Further, the full load condition 330 has a lower frequency than the half load condition 320 and the light load condition 310. Increasing the frequency (i.e., PWM frequency, cycle frequency) in the light load condition 310 reduces the time spent in a charging phase (i.e., reduces an amount of energy stored), which is acceptable because the light load requires less current in the discharging phase (i.e., than the other conditions).

The power converter system 100 includes a frequency controller 300 that is configured to determine an amount of negative current in a cycle. The frequency controller 300 can then adjust the PWM frequency (i.e., OSC signal frequency) to make the amount of negative current closely match (e.g., within 10%) what is required for soft switching (i.e., ZVS).

The amount of negative current may correspond to the fall period (i.e., $t_{SW\_FALL}$) of the switch node voltage ($V_{SW}$). The switch node voltage decreases with a rate (i.e., dV/dt) that corresponds to the negative current, as shown by the equation $I_{NEG}=C(dV/dt)$. From this equation, it can be determined that longer fall periods (i.e., lower dV/dt) correspond to less negative current than shorter fall periods (i.e., higher dV/dt). The present disclosure may determine a negative current condition based on a comparison of the fall period (i.e., $t_{SW\_FALL}$) to a threshold (i.e., $t_{ZVS\_REF}$).

The threshold (i.e., $t_{ZVS\_REF}$) may correspond to the optimal negative current for soft switching (i.e., ZVS). The term optimal refers to the theoretical amount of current necessary to exactly charge the output capacitance of the main switch 117 transistor for ZVS. In practice, optimal may be a range of negative currents that can provide a switching efficiency that is considered high (e.g., >50%). Deviation above or below the optimal value may decrease the switching efficiency.

One technical problem with using a fixed threshold is that the optimal negative current may vary in different situations. For example, the optimal negative current may vary over a range of voltages at the input to the ACF converter 101. For example, adjusting PWM frequency based on the fixed threshold (i.e., $t_{ZVS\_REF}$) may lead to extra negative current at the low line to achieve ZVS at both high and low lines. Additionally, different transistors (e.g., Super Junction, GaN, Si) may have different switch responses, which require different threshold adjustments. Accordingly, the present disclosure provides an adaptive threshold that can be adjusted based on changing negative current requirements.

Figure 4:
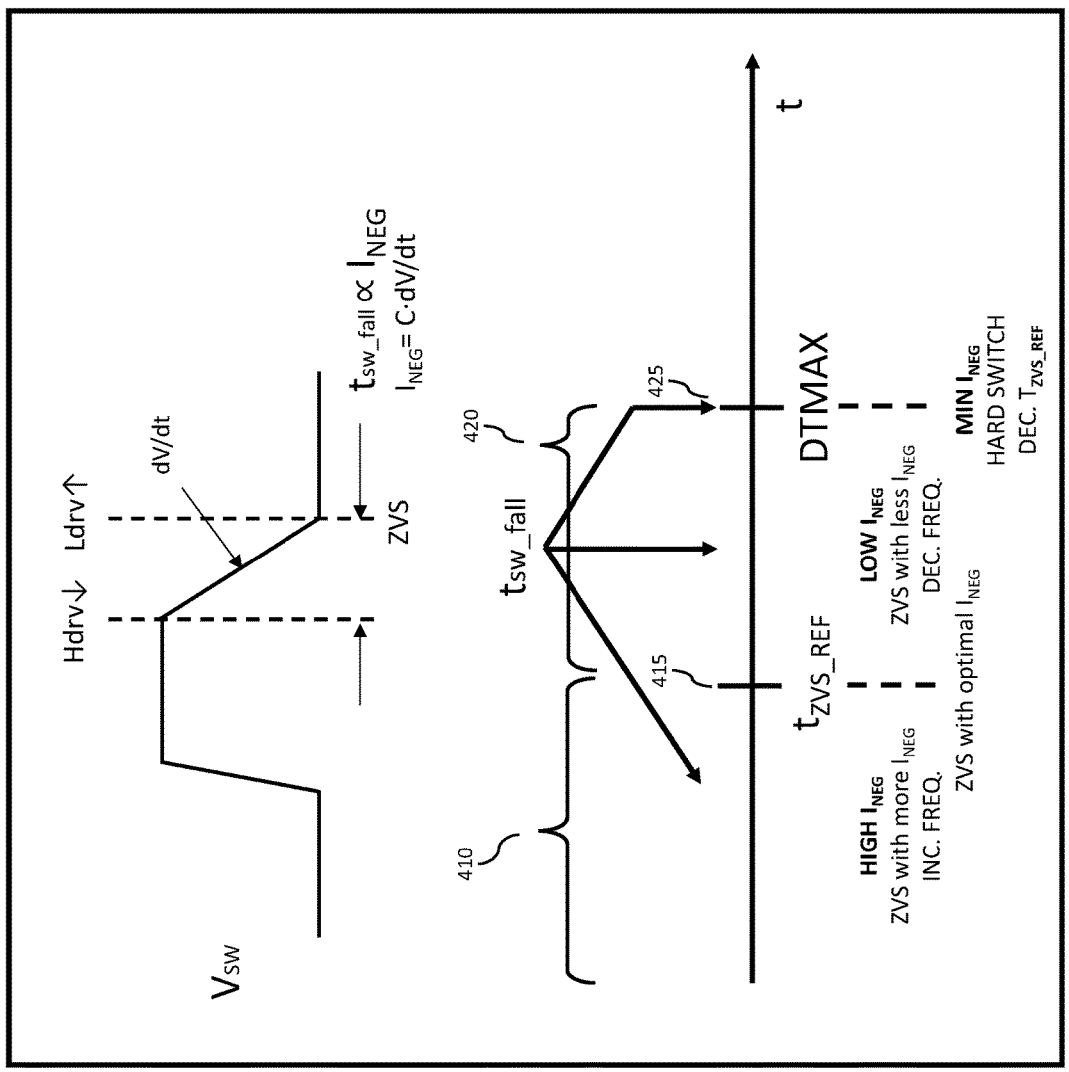
FIG. 4 are graphs of a switch node voltage and possible negative current conditions according to a possible implementation of the present disclosure.

FIG. 4 are graphs of a switch node voltage and possible negative current conditions according to a possible implementation of the present disclosure. The graphs illustrate a switch-node voltage ($V_{SW}$) at a switch node of the ACF power converter during a PWM cycle. The negative current ($I_{NEG}$) may correspond to (e.g., may be proportional to) a fall period ($t_{sw\_fall}$) of the switch-node voltage ($V_{SW}$) after the clamp switch 123 is turned OFF (i.e., triggered when Hdrv transitions LOW). The fall period may be measured as a time required for the switch-node voltage to transition from a HIGH level to a LOW value (e.g., zero voltage).

The negative current indicated by the fall period may be higher or lower than needed for ZVS. Accordingly, a measured fall period can be compared to a ZVS reference threshold (i.e., $t_{ZVS\_REF}$) to determine a high negative current condition 410 (i.e., HIGH $I_{NEG}$) or a low negative current condition 420 (i.e., LOW $I_{NEG}$).

The threshold 415 may be initially set to a pre-determined (e.g., user selected) based on measured or estimated data corresponding to a negative current required for an efficient (e.g., 100%) ZVS. The threshold may be adjusted based on sensed switching dynamics during operation.

When the fall period (i.e., tsw_fall) is less than the zero-volt-switching threshold (i.e, tsw_fall<$t_{ZVS\_REF}$) then a high negative current condition 410 exists. In other words, for the PWM cycle measured in the sequence of PWM cycles, the negative current condition is HIGH (HIGH $I_{NEG}$). In this condition, more negative current is generated than needed for ZVS (i.e., ZVS with more $I_{NEG}$). Accordingly, when the high negative current condition is determined, the frequency controller 300 may cause the PWM controller 150 to increase the PWM frequency (e.g., by an increment) in order to decrease the amount of negative current in subsequent PWM cycles.

When the fall period (i.e., tsw_fall) is greater than the zero-volt-switching threshold (i.e, tsw_fall<$t_{ZVS\_REF}$) then a low negative current condition 420 exists. In other words, for the PWM cycle measured in the sequence of PWM cycles, the negative current condition is LOW (i.e., LOW $I_{NEG}$). In this condition, less negative current is generated than needed for ZVS (i.e., ZVS with less $I_{NEG}$). Accordingly, when the low negative condition is determined, the frequency controller 300 may cause the PWM controller 150 to decrease the PWM frequency (e.g., by an increment) in order to decrease the amount of negative current in subsequent PWM cycles.

The frequency controller may not allow the fall period to extend beyond a period. In other words, a maximum fall period (i.e., timeout period 425) may be set (e.g., user set) for the fall period to reach its LOW level (i.e., reach zero volts). This maximum fall period (i.e., DTMAX) may correspond to the minimum negative current allowed by the system before the main switch is hard switched. The frequency controller is configured to detect that a timeout period 425 is reached (i.e., has expired) before the fall period ($t_{SW\_FALL}$) can be determined (e.g., before $V_{SW}$ reaches zero volts). In this condition the negative current may be considered to be a minimum negative current (MIN $I_{NEG}$). In this condition, ZVS is considered not practical and hard switching is used to switch the main switch. Accordingly, when the minimum negative current condition is determined, the frequency controller 300 may cause the PWM controller 150 to go ahead and hard switch the main switch at a time corresponding to the timeout period 425 (i.e., at DTMAX). In other words, a hard-switch condition is determined by detecting that a timeout period 425 is reached before the fall period of $V_{SW}$ can be determined.

The detection of a PWM cycle having a hard-switch condition can be used to adjust the threshold 415 ($t_{ZVS\_REF}$) to help prevent this hard switching situation in subsequent PWM cycles. Accordingly, the frequency controller may include a threshold controller 301 configured to adjust the threshold 415 (e.g., by an increment) in response to a hard-switch condition. For example, the threshold 415 may be decreased after one or more hard-switch conditions are detected in the PWM sequence. Alternatively, the threshold 415 may be increased after no hard-switch conditions are detected in the PWM sequence. Accordingly, the threshold controller 301 may include a counter that computes a running total of hard-switched PWM cycles and adjusts the threshold after the count reaches an amount. After the threshold adjustment, the counter may be reset, and the running total may be restarted.

Figure 5:
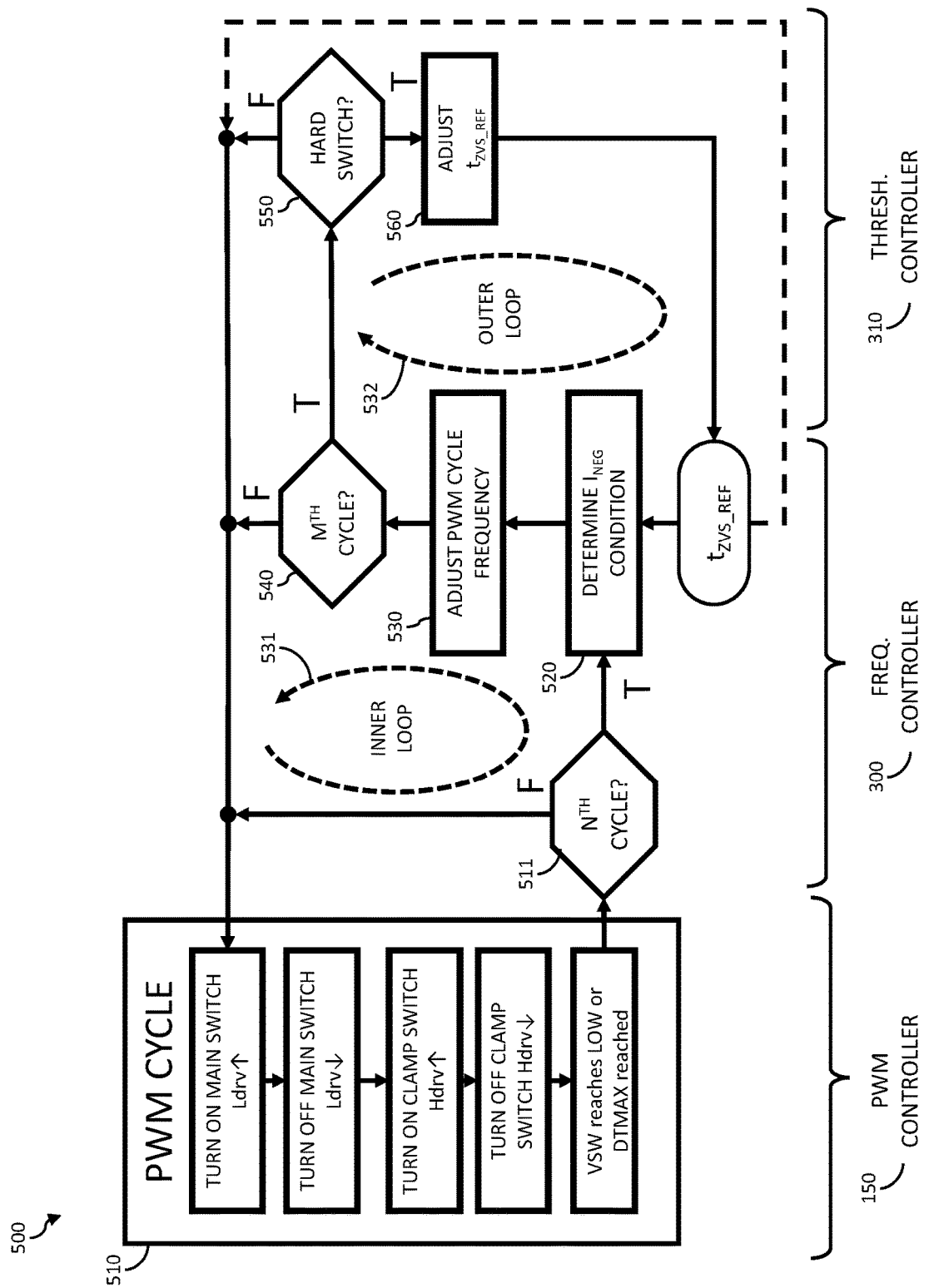
FIG. 5 is a flowchart illustrating a method for switching a power converter according to an implementation of the present disclosure.

FIG. 5 is a flowchart illustrating a method for switching a power converter according to an implementation of the present disclosure. The method 500 includes repeatedly executing a PWM cycle 510, as described in FIG. 2. The PWM cycle may be repeated after the switch node voltage ($V_{SW}$) reaches the LOW level (e.g., zero volts) or after a timeout period (DTMAX) has elapsed. In other words, a PWM controller 150 may be configured to soft switch (ZVS) the main switch ON when $V_{SW}$ reaches its LOW value (e.g., zero volts) or hard switch the main switch ON when DTMAX is reached before $V_{SW}$ reaches its LOW value (e.g., zero volts).

The method 500 further includes periodically adjusting (i.e., updating) the PWM cycle frequency (i.e., PWM frequency). As shown in FIG. 5, the periodic adjustment of the frequency may occur every Nth PWM cycle of the PWM sequence, where N 1. In other words, the periodic frequency adjustment may be according to a frequency update rate (i.e., inner loop frequency). Every Nth PWM cycle 511, the frequency controller 300 may be configured to determine 520 an $I_{NEG}$ condition. The $I_{NEG}$ condition may be determined by measuring a fall period for a switch node voltage and comparing the fall period to a zero-volt switching threshold (i.e., $t_{ZVS\_REF}$). Based on the negative current condition, a PWM cycle frequency may be adjusted 530 for subsequent PWM cycles in the sequence of PWM cycles.

The method 500 further includes periodically adjusting (i.e., updating) the zero-volt switching threshold. As shown in FIG. 5, the adjustment of the threshold may occur every Mth cycle of the frequency control, where M 1. In other words, the frequency controller 300 and the threshold controller 301 may form two control loops. The two control loops are arranged as an inner loop 531 corresponding to the frequency control and an outer loop 532 corresponding to the threshold control. The frequency update rate (i.e., inner loop frequency) can be greater than or equal to the threshold update rate (outer loop frequency).

Every Mth PWM cycle 540, the threshold controller 301 may be configured to detect 550 an occurrence of a PWM cycle having a hard-switch condition. Detecting the hard-switch condition (i.e., see FIG. 4, MIN $I_{NEG}$) may include determining how many PWM cycles have been hard switched since the last iteration of the outer loop and if this number (N) is greater than or equal to an amount (e.g., 1 or more) then detecting the hard-switch condition for that iteration of the outer loop. Based on the occurrence of the hard-switch condition, the threshold controller may be configured to adjust 560 (e.g., increase or decrease) the zero-volt-switching threshold. For example, the zero-volt-switching threshold may be reduced by an increment or can be reduced by an amount corresponding to the number of hard switched PWM cycles.

Figure 6:
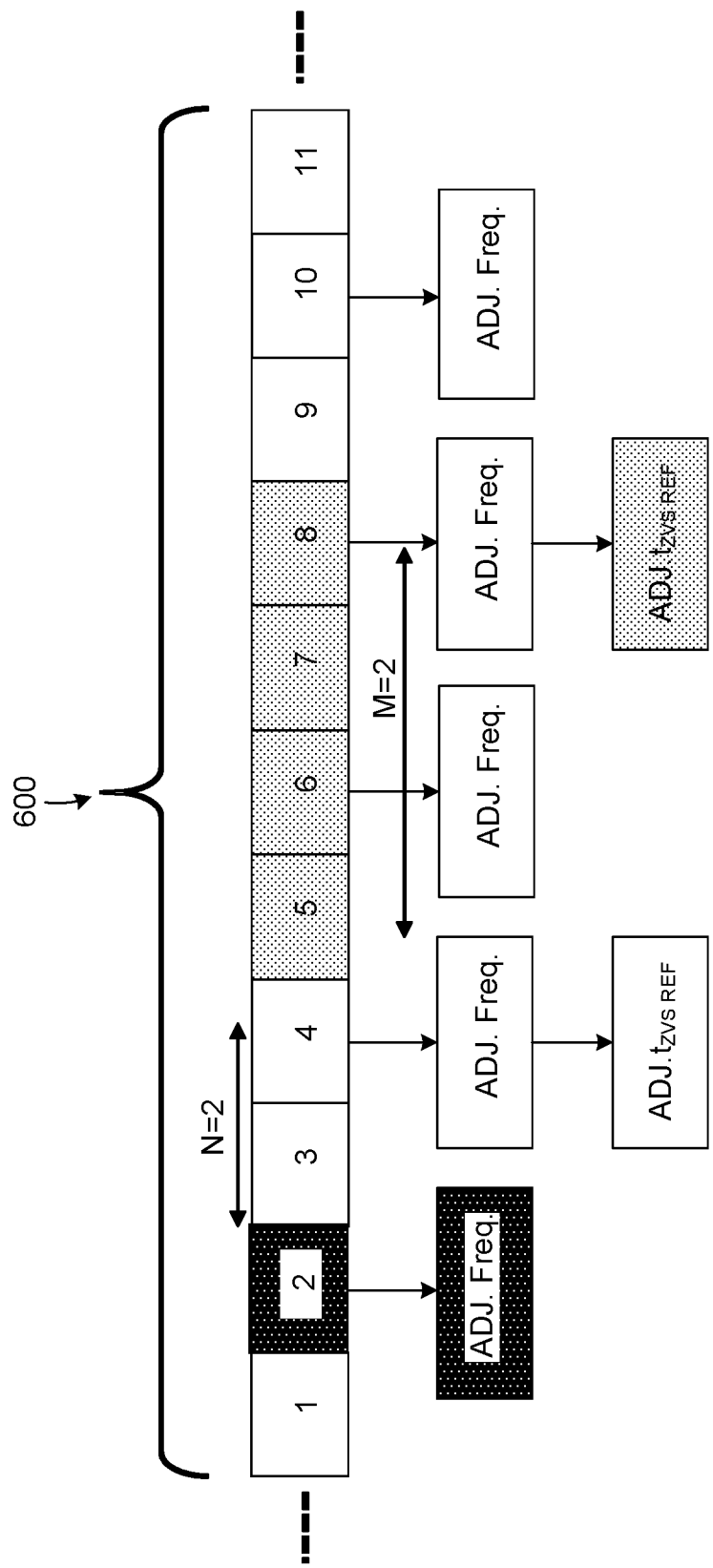
FIG. 6 illustrates a portion of a sequence of pulse width modulation (PWM) cycles according to an implementation of the present disclosure.

FIG. 6 illustrates a portion of a sequence of PWM cycles according to an implementation of the present disclosure. The PWM sequence 600 includes PWM cycles (1, 2, 3, . . . , 11). The example shown is strictly to aid in understanding and is not intended to be limiting. As shown, the frequency adjustment may be every other cycle (i.e., N=2). For example, the frequency adjustment at the $2^{nd}$ PWM cycle may be based on a negative current condition of the $2^{nd}$ PWM cycle, as indicated by the shading. As shown, the threshold adjustment may be every other interaction of the frequency adjustment (i.e., M=2). This rate may correspond to every $4^{th}$ PWM cycle. For example, the threshold adjustment at the $8^{th}$ PWM cycle may be based on the number of the PWM cycles 5, 6, 7, and 8 that included a hard switching negative current condition, as indicated by the shading. When none of the PWM cycles (5, 6, 7, 8) included a hard-switch condition, then no adjustment of the zero-volt switching threshold may occur. Alternatively, when one or more of the PWM cycles (5, 6, 7, 8) include a hard-switch condition, then an adjustment of the zero-volt switching threshold may occur.

FIG. 7 is a schematic of a power converter system including an active clamp flyback converter according to an implementation of the present disclosure. The system 700 includes a ACF converter 101 coupled to a load. The system further includes a PWM controller 150 configured to supply switching signals to the ACF converter 101. In particular, the PWM controller is configured to transmit an LDRV signal to a gate of a main transistor operating as the main switch and a HDRV signal to a gate of clamp transistor operating as the clamp switch.

The system 700 further includes a frequency controller 300 configured to control the frequency of the switching signals. The frequency controller 300 is configured to receive a signal (SW) from a switch node of the ACF converter 101. The frequency controller 300 includes a SW detect circuit 710 that is configured to sense a zero-volt signal (zvs_sense). The zero-volt signal can correspond to a fall period of the switch node voltage. The frequency controller 300 further includes a comparator 720 that can compare the zero-volt signal to a threshold ($t_{ZVS\_REF}$). The frequency controller 300 further includes a frequency control circuit 730 configured to increase or decrease the PWM frequency of the PWM controller 150 based on the output of the comparator 720.

The system 700 further includes a threshold controller 301 configured to control the threshold used for frequency control of the switching signals. The threshold controller 301 is configured to receive the zero-volt signal from the frequency controller 300. The threshold controller further includes a hard-switch detection circuit 750 configured to detect a hard-switch condition. The threshold controller 301 further includes a threshold control circuit 760 configured to increase or decrease the threshold ($t_{ZVS\_REF}$) used by the frequency controller 300.

Figure 8:
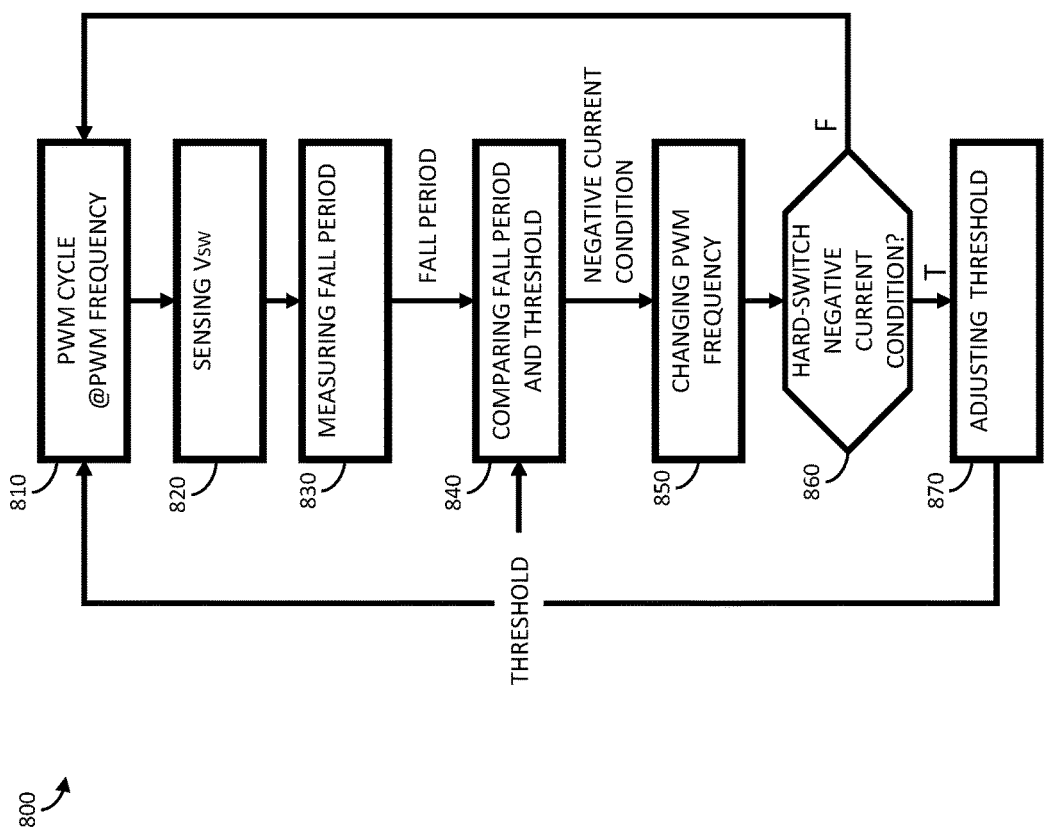
FIG. 8 is a flowchart illustrating a method for switching a power converter according to an implementation of the present disclosure.

FIG. 8 is a flowchart illustrating a method for switching a power converter according to an implementation of the present disclosure. The method 800 includes cycling 810 a power converter according to a PWM cycle including switching the power converter at a PWM frequency. The method 800 further includes sensing 820 a switch-node voltage ($V_{SW}$) at a switch node of the power converter during the PWM cycle. The method 800 further includes measuring 830 a fall period of the switch-node voltage during the PWM cycle and comparing 840 the fall period to the threshold to determine a negative current condition. The method 800 further includes changing 850 the PWM frequency for subsequent PWM cycles in the sequence of PWM cycles based on the negative current condition of the PWM cycle. The method 800 further includes adjusting 870 the threshold if a hard-switch condition has occurred 860.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A power converter system comprising:
   an active clamp flyback (ACF) converter including:
   a primary winding of a transformer coupled between a positive input and a switch node;
   a main switch coupled between the switch node and a negative input of the ACF converter; and
   an active clamp coupled between the positive input and the switch node, the active clamp including a clamp capacitor coupled in series with a clamp switch;
   a pulse width modulation (PWM) controller configured to control ON/OFF states of the clamp switch and the main switch according to a PWM cycle operating at a PWM cycle frequency; and
   a frequency controller configured to:
   compare a fall period of a switch node voltage to a zero-volt-switching threshold to determine a negative current condition at the switch node;
   detect a count of PWM cycles in a sequence of PWM cycles having a hard-switch condition characterized by the fall period reaching a timeout period; and
   adjust the zero-volt-switching threshold based on the count.

2. The power converter system according to claim 1, wherein the frequency controller is further configured to:
   adjust the PWM cycle frequency of the PWM controller based on the negative current condition.

3. The power converter system according to claim 2, wherein:
   the PWM cycle frequency is adjusted periodically at an inner loop frequency; and
   the zero-volt-switching threshold is adjusted periodically at an outer loop frequency, the inner loop frequency greater than the outer loop frequency.

4. The power converter system according to claim 1, wherein the ACF converter further includes:
   a secondary winding having a polarity opposite to the primary winding;
   a diode coupled between a first terminal of the secondary winding and a positive output of the ACF converter; and
   an output capacitor coupled between the positive output of the ACF converter and a negative output of the ACF converter.

5. The power converter system according to claim 1, wherein the frequency controller is further configured to:
   determine that the negative current condition is a high negative current condition when the fall period is less than the zero-volt-switching threshold; and
   determine that the negative current condition is a low negative current condition when the fall period is greater than the zero-volt-switching threshold.

6. The power converter system according to claim 5, wherein the frequency controller is further configured to:
   increase the PWM cycle frequency of the PWM controller when the negative current condition is the high negative current condition; and
   decrease the PWM cycle frequency of the PWM controller when the negative current condition is the low negative current condition.

7. The power converter system according to claim 1, wherein the frequency controller is further configured to:
   detect the hard-switch condition as being the timeout period being reached before the fall period can be determined.

8. The power converter system according to claim 7, wherein the frequency controller is further configured to:

hard switch the main switch after the timeout period is reached, otherwise soft switch the main switch.

9. A method for switching a power converter comprising:
sensing a switch-node voltage at a switch node of the power converter during a pulse width modulation (PWM) cycle, the PWM cycle being one PWM cycle in a sequence of PWM cycles;
measuring a fall period of the switch-node voltage during the PWM cycle;
comparing the fall period to a zero-volt-switching threshold to determine a negative current condition of the PWM cycle;
changing a PWM frequency for subsequent PWM cycles in the sequence of PWM cycles based on the negative current condition of the PWM cycle;
determining a hard-switch condition for a PWM cycle when a timeout period occurs before the fall period can be measured;
counting a number of PWM cycles having the hard-switch condition; and
adjusting the zero-volt-switching threshold when the number of PWM cycles having the hard-switch condition exceeds an amount.

10. The method according to claim 9, wherein adjusting the zero-volt-switching threshold after the hard-switch condition has occurred further includes:
decreasing the zero-volt-switching threshold when the number of PWM cycles having the hard-switch condition exceeds the amount.

11. The method according to claim 9, wherein comparing the fall period to the zero-volt-switching threshold to determine the negative current condition of the PWM cycle includes:
determining a low negative current condition when the fall period is greater than the zero-volt-switching threshold.

12. The method according to claim 11, wherein changing the PWM frequency for subsequent PWM cycles in the sequence of PWM cycles based on the negative current condition of the PWM cycle includes:
decreasing the PWM frequency when the low negative current condition has been determined.

13. The method according to claim 9, wherein comparing the fall period to the zero-volt-switching threshold to determine the negative current condition of the PWM cycle includes:
determining a high negative current condition when the fall period is less than the zero-volt-switching threshold.

14. The method according to claim 13, wherein changing the PWM frequency for subsequent PWM cycles in the sequence of PWM cycles based on the negative current condition of the PWM cycle includes:
increasing the PWM frequency when the high negative current condition has been determined.

15. A method for switching a power converter comprising:
according to a frequency update rate:
measuring a fall period for a switch node voltage of a pulse width modulation (PWM) cycle in a sequence of PWM cycles;
comparing the fall period to a zero-volt-switching threshold to determine a negative current condition; and
adjusting a PWM cycle frequency for subsequent PWM cycles in the sequence of PWM cycles based on the negative current condition; and
according to a threshold update rate:
detecting a count of PWM cycles having a hard-switch condition; and
adjusting the zero-volt-switching threshold based on the count.

16. The method for switching the power converter according to claim 15, wherein detecting an occurrence of a PWM cycle having the hard-switch condition includes:
detecting that a timeout period is reached before the fall period can be determined as the hard-switch condition.

17. The method for switching the power converter according to claim 15, wherein:
the frequency update rate is greater than the threshold update rate.

18. The method for switching the power converter according to claim 15, wherein:
the negative current condition is a high negative current when the fall period is less than the zero-volt-switching threshold; and
the negative current condition is a low negative current when the fall period is greater than the zero-volt-switching threshold.

19. The method for switching the power converter according to claim 18, wherein adjusting the PWM cycle frequency for subsequent PWM cycles based on the negative current condition includes:
increasing the PWM cycle frequency when the negative current condition is the high negative current; and
decreasing the PWM cycle frequency when the negative current condition is the low negative current.

* * * * *